No. 763,923. Patented June 28, 1904.

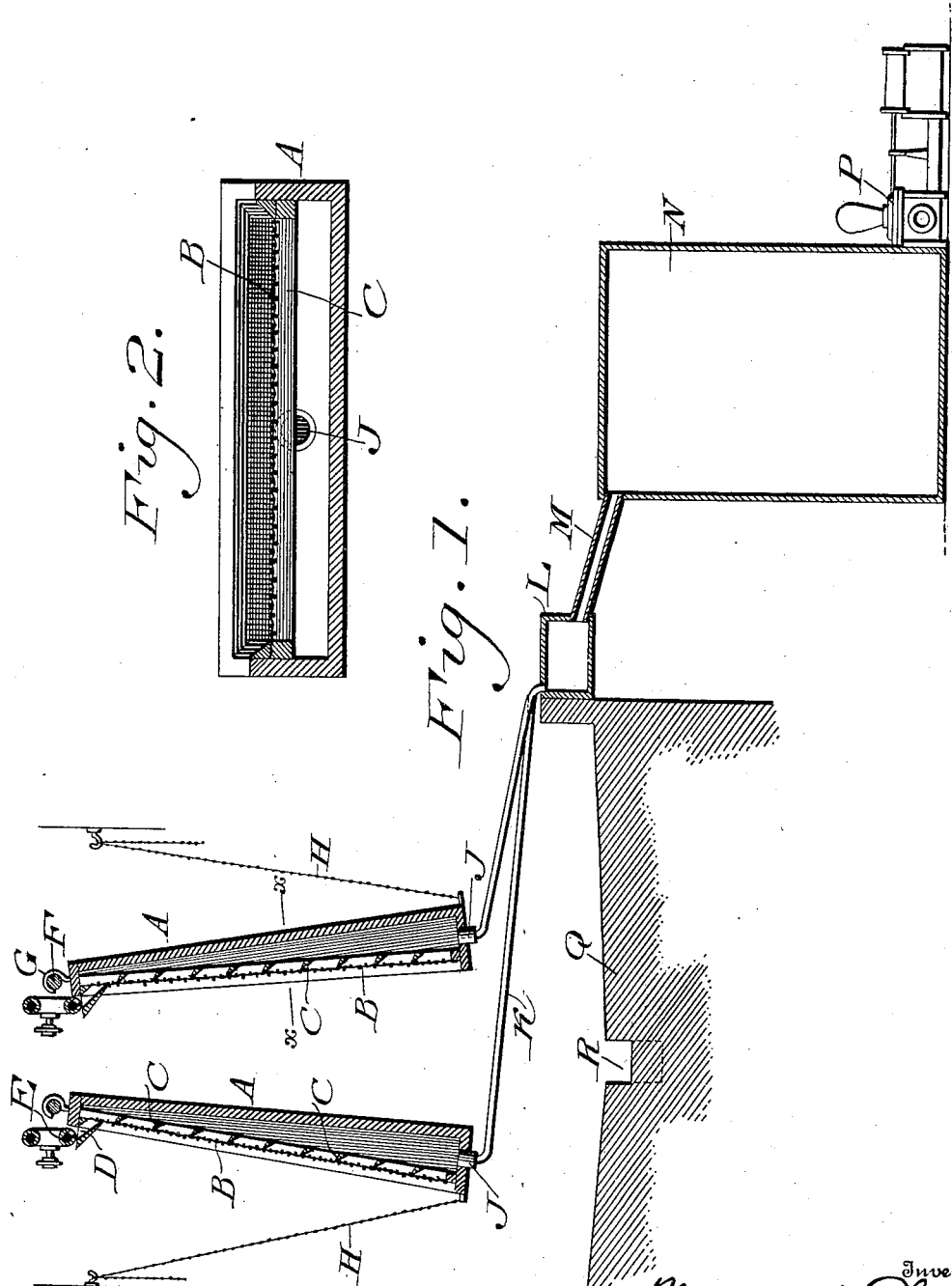

UNITED STATES PATENT OFFICE.

MAURICE W. PHILLIPS, OF PHILADELPHIA, PENNSYLVANIA, ASSIGNOR TO THE PENNSYLVANIA CLAY COMPANY, A CORPORATION OF NEW JERSEY.

METHOD OF SEPARATING CLAY OR OTHER INSOLUBLE MATERIALS.

SPECIFICATION forming part of Letters Patent No. 763,923, dated June 28, 1904.

Application filed December 23, 1902. Serial No. 136,397. (No specimens.)

*To all whom it may concern:*

Be it known that I, MAURICE W. PHILLIPS, a citizen of the United States, residing in the city and county of Philadelphia, State of Pennsylvania, have invented a new and useful Improvement in Methods of Separating Clay or other Insoluble Material, of which the following is a specification.

In United States Letters Patent No. 715,212, granted December 2, 1902, and No. 717,118, granted December 30, 1902, I have shown an apparatus and a method for screening insoluble materials and in which the material to be screened, such as clay, is reduced to a finely-divided state and suspended in water and then fed upon a substantially upright screen of fibrous material, the principle being that by employing a fibrous material of the finest mesh such mesh is further reduced in size due to the absorption of water by said fibrous material. In said Letters Patent the screens are inclined slightly and with the lower end of the screen a little in front, so that, as far as I am informed, the passage of a portion of the water and suspended material through the screen was due to gravity; but my present invention relates to a method in which I employ atmospheric pressure either alone or in connection with gravity to cause a portion of the water and suspended material fed to the upper end of the screen to pass therethrough.

In the accompanying drawings I have shown one embodiment of an apparatus by which my method can be carried out, and in which—

Figure 1 is a vertical section illustrating two screening apparatuses and a box or tank which receives the water and suspended material passing through the screening apparatus. Fig. 2 represents a sectional view, on an enlarged scale, of one of the screening apparatuses, taken on the line $x$ $x$ of Fig. 1.

Similar letters of reference indicate corresponding parts in the figures.

Referring to the drawings, my method consists in employing a closed casing, over one open side of which is situated a screen, which is conveniently of silk of the finest mesh, which closes this entire side of the casing. The lower end of this casing has an outlet that communicates, by a suitably-inclosed passage, such as a pipe, with suitably-inclosed receptacles to receive the water and suspended material and through the medium of which the desired atmospheric pressure on the outer face of the screen is attained by which the passage of a portion of the water and suspended material fed to the screen is forced through the latter. This atmospheric pressure can be attained by a slight suction within the casing, and this suction may be created by the head of water within the closed passage and receptacles communicating with the casing due to gravity, or by the employment of a pump for drawing the water from said receptacle, or by the combined use of a hydrostatic head and the pump.

In the apparatus illustrated for carrying out this method I have shown two screening apparatuses A, consisting of closed casings, one side of which, however, is closed by a screen B, which, as before stated, is preferably made of silk of the finest mesh, and I preferably employ deflectors C, contacting with the rear face of the screen to lead away therefrom at intervals the water and suspended material passing therethrough. There is a trough or channel D at the upper ends of these screens, into which the water and suspended material to the screen are fed by the pipe E, the lower end of said trough having a plurality of small openings for distributing the water and material across the entire front face of the screen. These screening apparatuses are suspended by a bar F or other suitable support by means of the hook G at the upper end of the casing. Thus the screening apparatuses can be adjusted—that is to say, can be held with their lower ends inclined slightly to the front, as at the left hand in Fig. 1, or inclined slightly to the rear, as shown at the right hand of Fig. 1— by means of chains H or other suitable devices, as will be obvious, or the screens may be in a strictly-vertical position, as will be understood.

There is an outlet-port J in the lower end of the casing, which communicates with an inclosed passage, such as a pipe K, with a closed box L, the latter being situated below the lower end of the casing, so that the water and material will produce a head or fall. From the box L an inclosed passage or pipe M leads to the upper end of the closed reservoir N, said passage M being inclined downwardly, while at the lower end of the reservoir N the material can be removed by the pump P.

Q designates the floor of the room or building in which the screening apparatuses A are placed and upon which falls the water and suspended material that does not pass through the screen, the same running into the trough R, from which it can be carried to any suitable place.

In carrying out this method—for instance, in separating the coarse and fine particles of clay—the matter is reduced to a finely-divided state and suspended in water and then fed to the troughs D at the upper ends of the screen, being distributed across the entire face of the latter and passing downwardly over the same. It may be that in the beginning a portion of the water and suspended material would not pass through the screen and into the casing, in which case the operation may be started by directing the stream from a hose upon the lower end of the screen, which forces water therethrough and fills the lower end of the casing and the pipe K, and then the head or fall in the pipe K produces a suction within the casing, so that the atmospheric pressure from the outer face of the screen will aid in causing a portion of the water and screening material to pass through the screen.

I have found, further, that the outlet from the box L must be such that the level of the water therein is maintained, so that the air-space within the box L is a little greater than the combined air-spaces within the casing A, communicating therewith, it being understood, of course, that any suitable number of screening apparatuses can be employed in each row, so that the length of the box L and reservoir N varies to correspond to the number of screening apparatuses employed. When the screen stands with its lower end inclined to the front, as shown at the left hand in Fig. 1, there is a tendency of the water and suspended material to pass through the mesh by gravity; but this tendency ceases, of course, when the screen is strictly vertical or when its lower end is inclined to the rear, as shown at the right hand of Fig. 1, and then, of course, the passage of the water and material through the screen is due to atmospheric pressure alone, as will be understood, for theoretically the passage of the water and suspended material through the screen is in an upward direction.

The suction due to the head or fall of the water may be supplemented or augmented by the suction of the pump P, as will be understood, or the aid of said pump P may be dispensed with, all of which is to be determined by the skill of the operator, the material being screened, its condition, the degree of separation desired, the inclination of the screening apparatus, the size of the mesh, and other conditions which have to be taken into consideration and determined by experience and skill in each particular case.

It is understood, of course, that the inclination of the screening apparatuses can be adjusted, and although I have shown, for the purpose of illustration, a single continuous pipe K it is obvious that others of different lengths may be substituted or sections added or removed therefrom by employing suitable couplings.

Having thus described my invention, what I claim as new, and desire to secure by Letters Patent, is—

1. The herein-described method of treating insoluble materials, which consists in reducing the material to a finely-divided state and suspending the same in liquid, continuously passing the mixture over a screen of mesh sufficiently fine to permit only a portion of the liquid to pass through the same, and passing the same through a vacuum-creating means connected with the screen, whereby such portion as passes through the screen creates an excess of atmospheric pressure upon the face of the screen, and such portion as does not pass through seals said screen against the passage of air.

2. The herein-described method for treating insoluble materials, which consists in reducing the material to a finely-divided state and suspending the same in a liquid, then continuously passing the liquid and suspended material across the face of the substantially upright screen of fibrous material of finest mesh, having both faces exposed, whereby the size of the mesh is reduced by absorption of the water, sufficiently to permit a portion only of the mixture to pass through the meshes, and passing such portion through a vacuum-creating means attached to the screen to create an excess of atmospheric pressure upon the working face of the screen.

3. The herein-described method of treating insoluble materials, which consists in reducing the material to a finely-divided state and suspending the same in liquid, continuously passing the mixture over a screen of mesh sufficiently fine to permit only a portion of the mixture to pass through the same, passing the same through a vacuum-creating means connected with the screen, whereby such portion passing through the screen creates an excess of atmospheric pressure upon the face of the screen and such portion as does not pass through seals said screen against the passage of air, and guiding the mixture passing through the screen away therefrom at intervals.

MAURICE W. PHILLIPS.

Witnesses:
HARRY COBB KENNEDY,
C. D. McVAY.